Figure 1:
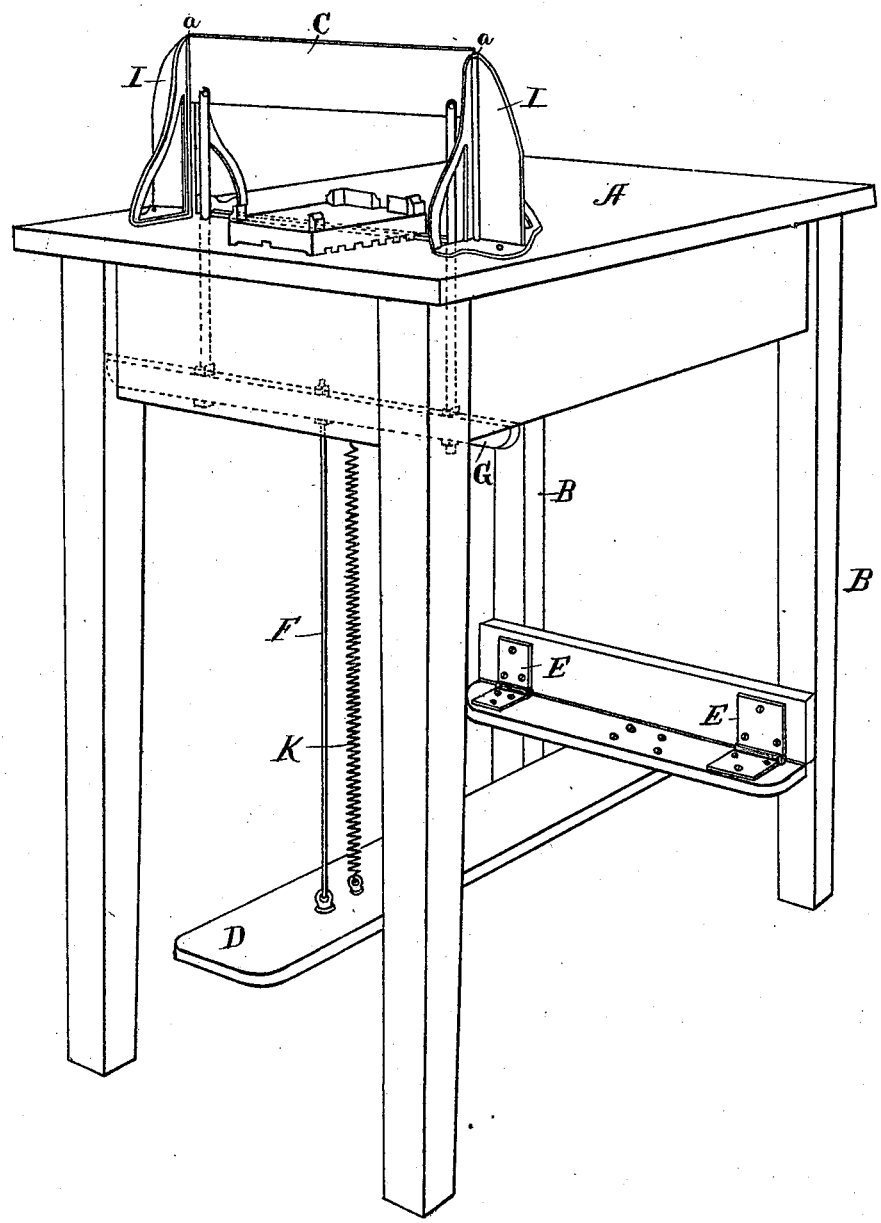

(No Model.)  2 Sheets—Sheet 1.
W. PRIGGE.
APPARATUS FOR CUTTING ICE CREAM, &c.

No. 502,863. Patented Aug. 8, 1893.

WITNESSES:
Thos. F. Conicy.
Wm. H. Capel

INVENTOR
William Prigge
BY
H. C. Townsend
ATTORNEY.

(No Model.) 2 Sheets—Sheet 2.
W. PRIGGE.
APPARATUS FOR CUTTING ICE CREAM, &c.
No. 502,863. Patented Aug. 8, 1893.
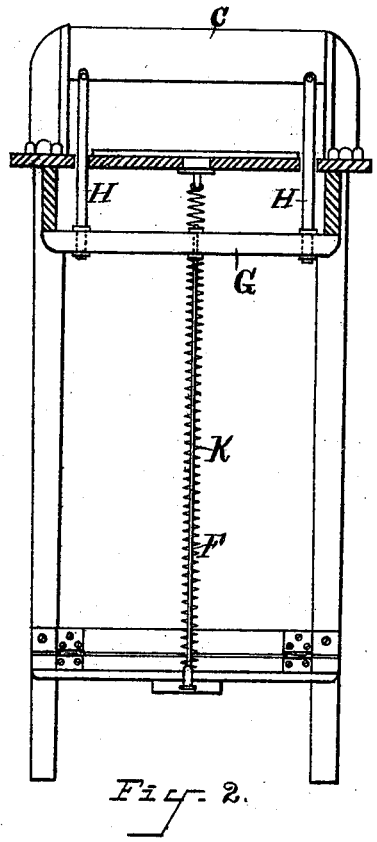
Fig. 2.
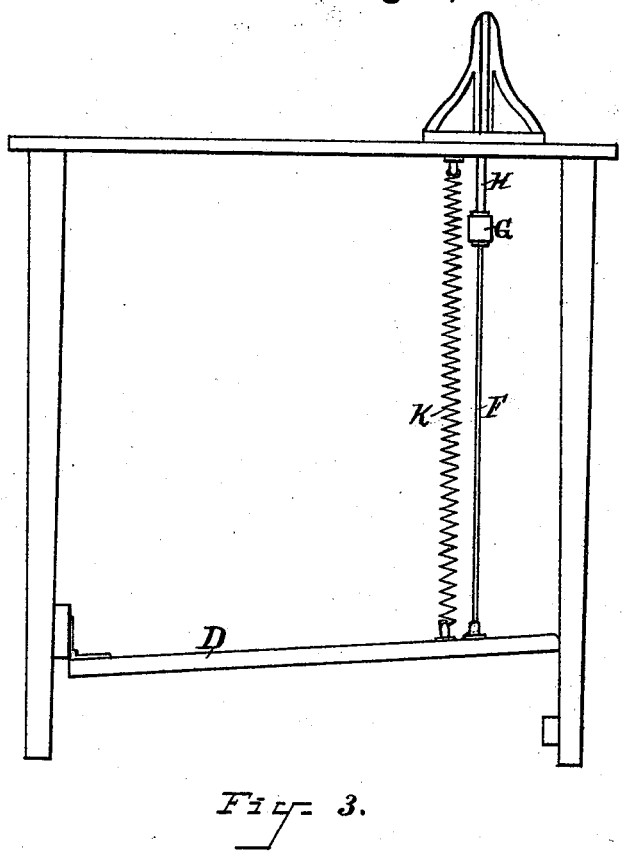
Fig. 3.
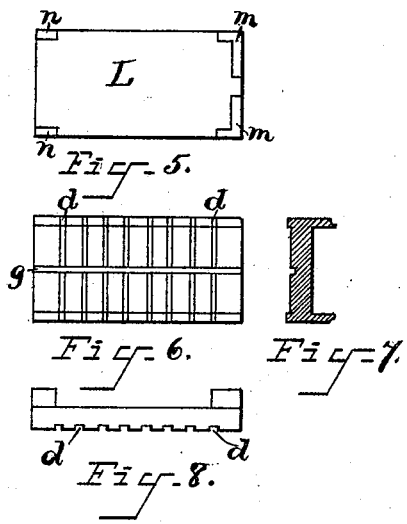
Fig. 5.
Fig. 6.
Fig. 7.
Fig. 8.
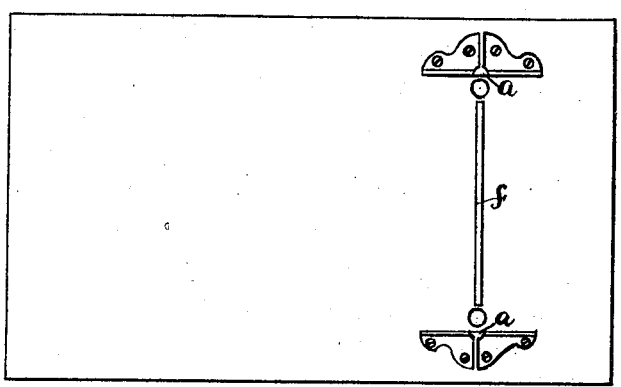
Fig. 4.
WITNESSES:
Thos. F. Conrey.
Wm. H. Capel.
INVENTOR
William Prigge
BY
H. C. Townsend
ATTORNEY.

UNITED STATES PATENT OFFICE.

WILLIAM PRIGGE, OF FLUSHING, NEW YORK.

APPARATUS FOR CUTTING ICE-CREAM, &c.

SPECIFICATION forming part of Letters Patent No. 502,863, dated August 8, 1893.

Application filed April 6, 1893. Serial No. 469,340. (No model.)

*To all whom it may concern:*

Be it known that I, WILLIAM PRIGGE, a citizen of the United States, and a resident of Flushing, in the county of Queens and State of New York, have invented certain new and useful Apparatus for Cutting Ice-Cream into Blocks, of which the following is a specification.

My invention relates to an apparatus for dividing ice cream or similar material adapted to be divided by a cutter or knife into bricks, squares or pieces of uniform size.

The object of my invention is to provide a cheap, efficient and cleanly apparatus more particularly adapted for use in cutting up solid blocks of ice cream.

My invention consists in the combination with a suitable knife or cutter mounted to reciprocate in a vertical plane above a proper table, of a block or carrier for the mass of material to be divided, said block or carrier being provided on its bottom with transverse gage grooves or spaces and a fixed bar or projection mounted on the table beneath the knife and adapted to take into the gage grooves or spaces on the bottom of the holder.

My invention consists further of the movable holder for the block of ice cream or similar material provided with a longitudinal gage groove or depression on its bottom and a series of transverse gage grooves all adapted to take upon a bar or rod mounted on the table parallel to the knife blade.

My invention consists further in the com35 bination of devices as hereinafter more particularly described and claimed.

In the accompanying drawings:—Figure 1, is a perspective view of an apparatus embodying my invention. Fig. 2, is a transverse section through the table on a line in front of the knife or cutter. Fig. 3, is a side elevation of the apparatus. Fig. 4, is a plan of the table with the knife removed. Fig. 5, is a plan of the tray or support adapted to re45 ceive the block of cream or other material to be divided. Fig. 6, is an inverted plan view of the same. Fig. 7, is a tranverse section through the same. Fig. 8, is an edge view of the same.

A, indicates a suitable table or board preferably of wood and mounted upon legs or supports B, as shown, though it might be otherwise supported or mounted.

C, is the knife adapted to reciprocate in a vertical plane up and down in a line transverse to the plane of the table A. This knife I preferably operate by means of a treadle D, hinged as at E, to the back legs of the table or to any other suitable support. The treadle is connected with the knife through a rod F, which is attached to a cross bar G, of wood or other suitable material. Rods of iron H, pass through said cross bar being bolted to the same as indicated, and are riveted to the knife C, at or near the ends thereof.

I, I, indicate suitable guide standards which are preferably of cast iron for cheapness and which are provided with a guide groove at $a$, to receive the ends of the knife blade which works up and down in said grooves.

K, is a spring which is attached to the treadle D, at one end and at the other end to the bottom of the table and which serves to raise the knife after each operation.

L, is the carrier or support which receives the block or mass of frozen cream or other material that is to be divided up into bricks or squares of uniform size. This carrier or support is preferably made of wood for cheapness, and it is provided on its bottom with a series of transverse grooves $d$, which extend clear across, from one edge to the other thereof, and are adapted to fit upon a bar or rod $f$, which is fastened to the top of the table underneath the knife. The gage spaces or grooves $d$, serve not only to space off the material so that it may be divided uniformly by the knife, but also steady the carrier or support in position during the operation of cutting. Where it is desired to provide also for dividing the material longitudinally, the holder or support is provided with a longitudinal gage groove $g$.

Upon the top surface of the block L, there are provided suitable gage stops $m$, at the rear end thereof, adapted to center or hold the block of material to be divided into proper position upon the carrier or support. Similar projections or ledges at the sides of the block near the opposite end may be provided as indicated at $n$.

In using the apparatus the block of material which is preferably of size to fit on the top of the carrier L, in the space between the several lugs or projections m, n, is placed on top of the block and the latter is then put in position beneath the knife with the longitudinal groove g, registering or taking upon the rod or bar f, and the knife is then depressed by the operator thus dividing the block into two pieces of uniform size by a longitudinal cut. The block or carrier L, is then turned around by the operator and the transverse grooves or spaces d, are brought into engagement successively with the transverse bar or rod f, and by successive depressions of the knife C, by means of the foot, the block is divided up into pieces corresponding in size to the distance between the spaces or gage grooves d.

It will be obvious that by my invention no cumbersome or complicated machinery is necessary which will get out of order or accumulate dirt and the parts which come into contact with the material may be readily cleaned.

In practice it is desirable to provide with the apparatus a number of blocks L, which may have grooves or notches d, differently spaced to permit the material to be divided up into pieces of any desired size.

The lugs or projections n, m, may be attached by pieces of wood, iron or other material or may be, and preferably are, integral with the block L. It is desirable to make the block L, of hard wood but it will be obvious that it might be of any desired material.

While I have described the gage spaces or grooves as formed on the block or carrier, and the guide rod or bar as located upon the table, it is obvious that the relative locations might be reversed, the groove being upon the table and the gage rod or bars located upon the bottom of the carrier L, without departing from my invention.

What I claim as my invention is—

1. In a machine for dividing ice cream into bricks or blocks of uniform size, the combination substantially as described, of a vertically reciprocating knife, a carrier or holder provided with transverse gage grooves upon its bottom, and a gage rod or bar fixed upon the top of the table or support beneath the knife, as and for the purpose described.

2. In an apparatus for dividing ice cream or similar material into blocks or pieces of uniform size, the combination substantially as described, with the cutter or knife, of a block or carrier adapted to receive the mass of material to be divided, and provided on its bottom with one or more longitudinal and transverse gage grooves or spaces.

3. In a machine for dividing ice cream or similar material into bricks or pieces of uniform size, the combination substantially as described, of the table, a knife C, a treadle D, connected with said knife the guide standards I, and the block or carrier L, provided with grooves or notches upon its bottom adapted to register or engage with a suitable gage bar or rod upon the table, as and for the purpose described.

4. In a machine for cutting ice cream or similar material into bricks or pieces of uniform size, a movable gage block or carrier L, provided with longitudinal and transverse grooves or gage spaces upon its bottom, in combination with a gage bar or rod and a cutter mounted upon a suitable table or support, as and for the purpose described.

Signed at New York, in the county of New York and State of New York, this 4th day of April, A. D. 1893.

WILLIAM PRIGGE.

Witnesses:
WM. H. CAPEL,
THOS. F. CONREY.